United States Patent [19]

Andrews

[11] Patent Number: 5,757,413
[45] Date of Patent: May 26, 1998

[54] OPTICAL FILTERING SYSTEM FOR A DOCUMENT PROCESSING SYSTEM

[75] Inventor: John R. Andrews, Fairport, N.Y.

[73] Assignee: Xerox Corporation, Stamford, Conn.

[21] Appl. No.: 566,226

[22] Filed: Dec. 1, 1995

[51] Int. Cl.⁶ ........................................ B41J 2/47
[52] U.S. Cl. ........................... 347/256; 347/241; 347/134
[58] Field of Search ................................. 347/256, 241, 347/134

[56] References Cited

U.S. PATENT DOCUMENTS

4,150,396 4/1979 Hareng et al. ........................... 348/751

Primary Examiner—Mark J. Reinhart

[57] ABSTRACT

There is provided an optical filtering system intended for use in a raster scanning arrangement for a document processing system. The document processing system includes a laser beam generating device providing a laser beam and a raster scanning device for transmitting the provided laser beam along a path. The optical filtering system includes a) an optical filter, disposed in the path, for reflecting the laser beam or permitting a portion of the laser beam to be transmitted therethrough, and b) a heating subsystem, thermally communicating with the optical filter, for maintaining the optical filter at a substantially fixed temperature.

13 Claims, 8 Drawing Sheets

OPTICAL FILTERING SYSTEM FOR A DOCUMENT PROCESSING SYSTEM

The present invention relates generally to a technique for a system suited for use in a raster scanning arrangement of a multistation printing machine and, more particularly, to a beam separating arrangement, which, due to controlled heating thereof, performs optimally over a significant temperature range.

Color prints are currently produced by sequentially transferring and fusing overlapped images of each system color onto a single recording medium that is passed multiple times, once for each system color, through the printer. Such printers are called multiple pass printers. Conceptually, one can imprint multiple colors on a recording medium that is passed through the system only once by using a sequence of multiple xerographic stations, one for each system color. Such a printer, called hereinafter a multistation printer, would have a greater output than a multipass printer operating at the same raster sweep speed. However, the introduction of multistation printers has been delayed by 1) cost problems, at least partially related to the cost of multiple xerographic stations and the associated ROSs, and 2) image quality problems, at least partially related to the difficulty of producing similar spots on each photoreceptor and subsequently registering (overlapping) the latent images on the photoreceptors.

Some proposed prior art multistation printers have included individual ROSs (each comprised of separate polygon mirrors, lenses, and related optical components) for each station. For example, U.S. Pat. Nos. 4,847,642 and 4,903,067 to Murayama et al. involve such systems. Problems with these systems include the high cost of producing nearly identical multiple ROSs and the difficulty of registering the system colors.

U.S. Pat. No. 5,243,359 to Fisli discloses an improved multistation printer in which there is provided a raster output scanning system (ROS) having a rotating polygon mirror which simultaneously deflects a plurality of clustered, dissimilar wavelength laser beams having common optical axes from common mirror surface areas. The clustered beams are subsequently separated by a plurality of optical filters and then directed onto associated photoreceptors of a multistation printer.

Another improved multistation printer is disclosed in U.S. Pat. No. 5,276,463 in which a plurality of optical filters and mirrors are arranged, in a raster scanning system, for simultaneously delivering four beams to four photoreceptors, respectively. The multistation printer of the '463 patent uses wavelength and polarization selective reflection from cholesteric liquid crystals to separate the four beams and direct them to the respective photoreceptors.

The pertinent teachings of each of the above-described patents are incorporated herein by reference.

In application of the raster scanning system of the '463 patent, it has been found that temperature dependence of the cholesteric cell reflection maximum could either limit the temperature latitude over which one could expect high contrast in the separation of the beams or require wavelength separation to be larger than convenient. In a multistation printer, fluctuations in system performance, due to temperature dependence of cholesteric cells, is aggravated by variations in temperature which occur during operation of the multistation printer. It would be desirable to provide a system which insures consistent cholesteric cell operation over the expected temperature/operation range of the multistation printer.

In accordance with one aspect of the present invention there is provided an optical filtering system intended for use in a raster scanning arrangement for a document processing system. The document processing system includes a laser beam generating device providing a laser beam and a raster scanning device for transmitting the provided laser beam along a path. The optical filtering system includes: an optical filter, disposed in the path, for reflecting the laser beam or permitting a portion of the laser beam to be transmitted therethrough; and a heating subsystem, thermally communicating with said optical filter, for maintaining said optical filter at a substantially fixed temperature.

In accordance with another aspect of the present invention there is provided an optical filtering system intended for use in a laser system. The laser system has a laser beam generating device providing a laser beam with an intensity, the laser beam being directed along a path. The optical filtering system includes: an optical filter, disposed in the path, for reflecting the laser beam or permitting a portion of the laser beam to be transmitted therethrough; an adjustable heater with a power level, said heater thermally communicating with said optical filter; and a control circuit, communicating with said heater, for varying the power level of said heater when the laser beam intensity varies from a preset reference by a selected amount. In practice, the optical filter is maintained at a desirable ambient temperature by adjustment of said heater with said control circuit.

In accordance with yet another aspect of the present invention there is provided an optical filtering system intended for use in a laser system. The laser system has a laser beam generating device providing a laser beam with an intensity, the laser beam being directed along a path. The optical filtering system includes: an optical filter, disposed in the path, for reflecting the laser beam or permitting a portion of the laser beam to be transmitted therethrough; an adjustable electric field generator, communicating with said optical filter, for applying an electric field to said optical filter; and a control circuit, communicating with said adjustable electric field generator, for varying the applied electric field when the laser beam intensity varies from a preset reference by a selected amount.

These and other aspects of the invention will become apparent from the following description, the description being used to illustrate a preferred embodiment of the invention when read in conjunction with the accompanying drawings.

While the present invention is described hereinafter in connection with a multi-station printer having a single raster output scanner (ROS) that simultaneously deflects a plurality of clustered laser beams of dissimilar wavelengths and/or polarizations, and that subsequently separates those beams and applies them to individual photoreceptors where similarly dimensioned and registered spots are produced, the present invention is not intended to be limited to that application. On the contrary, the present invention is intended to cover all alternatives, modifications and equivalents as may be included within the scope of the appended claims.

Figure 1:
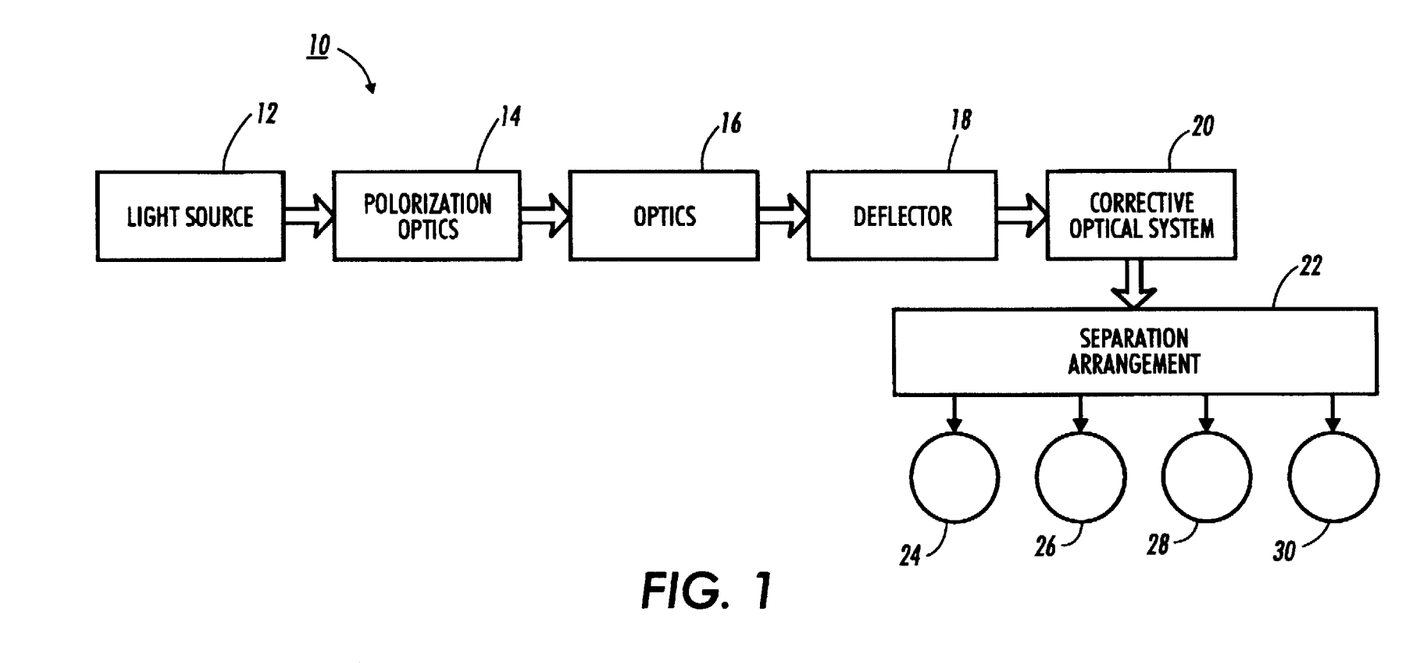
FIG. 1 is a schematic, block diagrammatic view of a raster output scanning arrangementfor a printing machine.

Referring to FIG. 1, a ROS arrangement is designated by the numeral 10. The arrangement 10 includes a light or laser source 12 coupled with a beam forming optics system 16 by way of a polarization control section 14. Two or more beams transmitted through the optics system 16 are directed to a separation arrangement 22 by way of a suitable deflector 18 and a correction optical system 20. In turn separated beams are delivered from the separation arrangement 22 to a respective one of rotating photoreceptors 24, 26, 28 and 30 or just one photoreceptor 122 (FIG. 13).

In one preferred embodiment, the ROS arrangement 10 is employed in a multi-station printer in which dissimilar wavelength laser beams are deflected synchronously across the four rotating photoreceptors 24, 26, 28 and 30. As the multi-station printer is preferably for full color reproduction, each laser beam produces a latent image on its associated photoreceptor that corresponds to a system color that will be transferred onto a recording medium (not shown).

In FIG. 1, the deflected laser beams have substantially parallel optical axes and are tightly clustered. One possible technique for obtaining such beams is to overlap beams of different wavelength using dichroic prisms as optical combiners, as discussed in the previously mentioned U.S. Pat No. 4,962,312. However, to reduce the problems of obtaining equal optical path lengths, to reduce the difficulty of spot registration, and to eliminate beam alignment problems, the ROS arrangement 10 of FIG. 1 generates closely spaced, multiple wavelength laser beams using either a single structure or closely adjacent structures. Literature describing such multiple wavelength devices are disclosed in U.S. Pat. No. 5,276,463.

Figure 2:
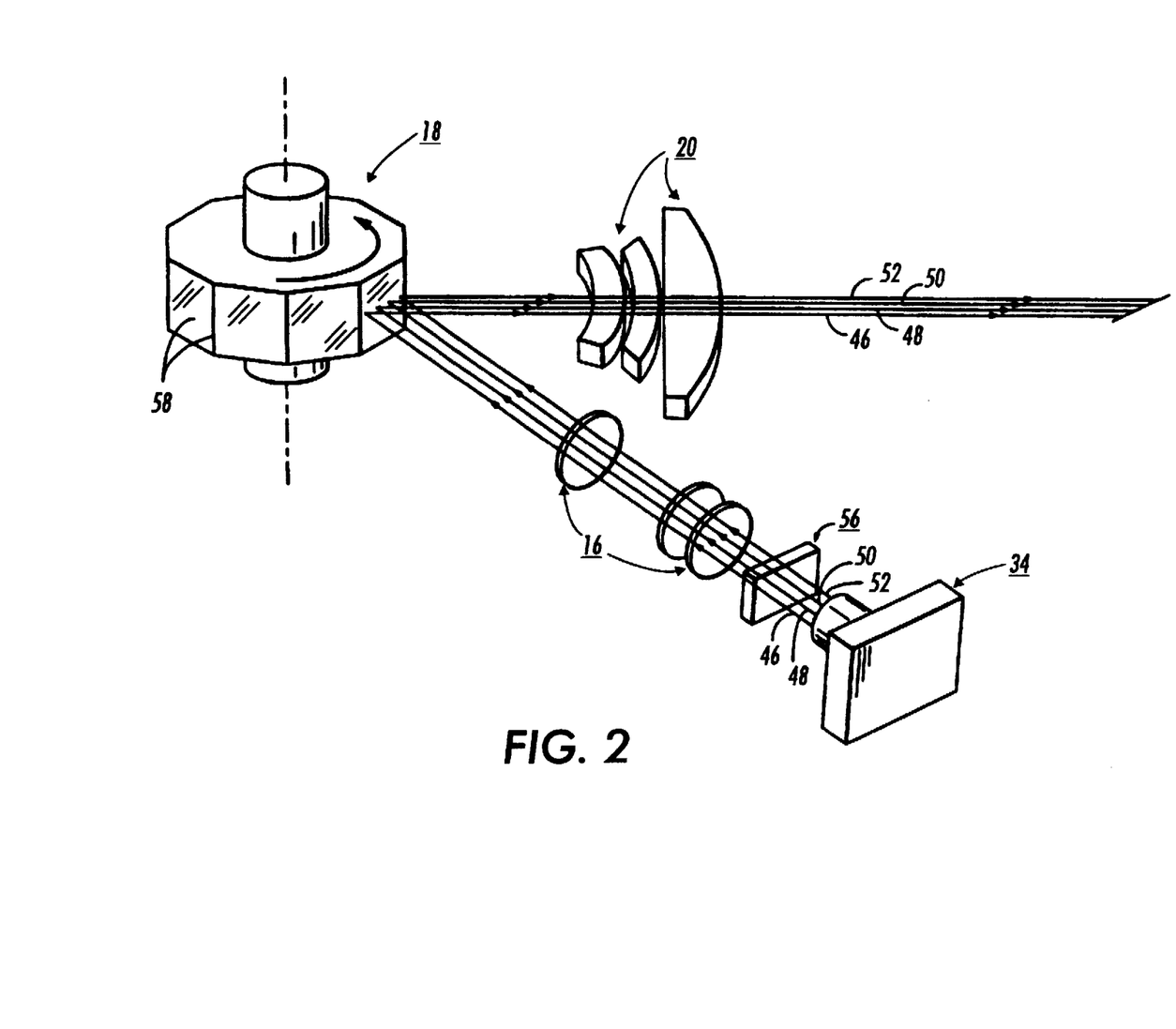
FIG. 2 is a perspective, schematic view illustrating the orientation of certain components of the ROS arrangement of FIG. 1, namely a light source, polarization control system, beam forming optics system, deflector and corrective optical system.
Figure 3:
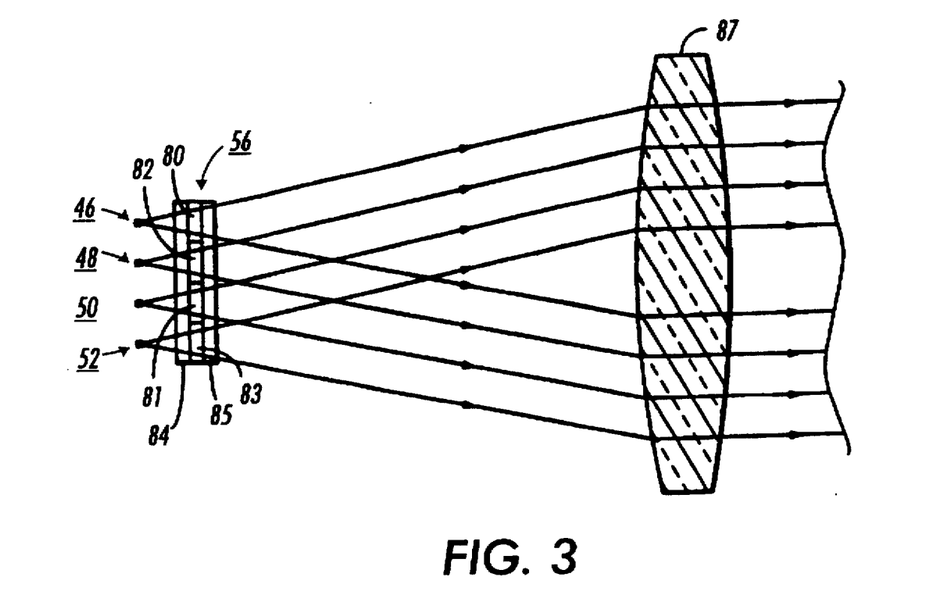
FIG. 3 is an elevational, schematic view of a segmented waveplate positioned adjacent to the light source of the ROS so that each beam passes through the waveplate.

Referring to FIG. 2, the ROS arrangement 10 is discussed in further detail. The illustrated ROS arrangement 10 of FIG. 2 employs a light generating device 34, which, as shown in FIG. 3, and disclosed in U.S. patent application Ser. No. 07/(D/92145) to Paoli and Appel, can comprise a plurality of relatively closely spaced laser diodes 36, 38, 40 and 42 fabricated monolithically on a single semiconductor chip 44. Typically, the laser diodes are separated from one another by a distance which is greater than or equal to 50 µm. In one example, the light generating device emits four laser beams 46, 48, 50 and 52, two of which beams have a wavelength of 650 nm and two of which beams have a wavelength of 685 nm. As will appear from the discussion below, the ROS arrangement of the present invention can be practiced with more or less than four laser beams, while the respective wavelengths and/or respective polarizations of the employed beams can be altered significantly without affecting the concept upon which the present invention is based. For purposes of clarity, in various drawings of the present application, only the chief rays of the beams 46, 48, 50 and 52 are shown. Light generating device device 34 effectively provides a substantially common spatial origin for each beam. Each beam is independently modulated so that it exposes its associated photoreceptor in accordance with a respective color image.

Still referring to FIG. 2, the four laser beams from device 34 are input to a segmented waveplate 56, the details of which will be described below, and then the optics system 16, preferably including a collimator lens and directing the beams onto an optical path such that they illuminate the deflector 18, which, in one example, comprises a rotating polygon mirror having a plurality of facets 58. As the polygon mirror rotates, the facets cause the reflected beams to deflect repeatedly for input to the correction optical system 20, which focuses the beams and corrects for errors such as polygon angle error and wobble.

Figure 4:
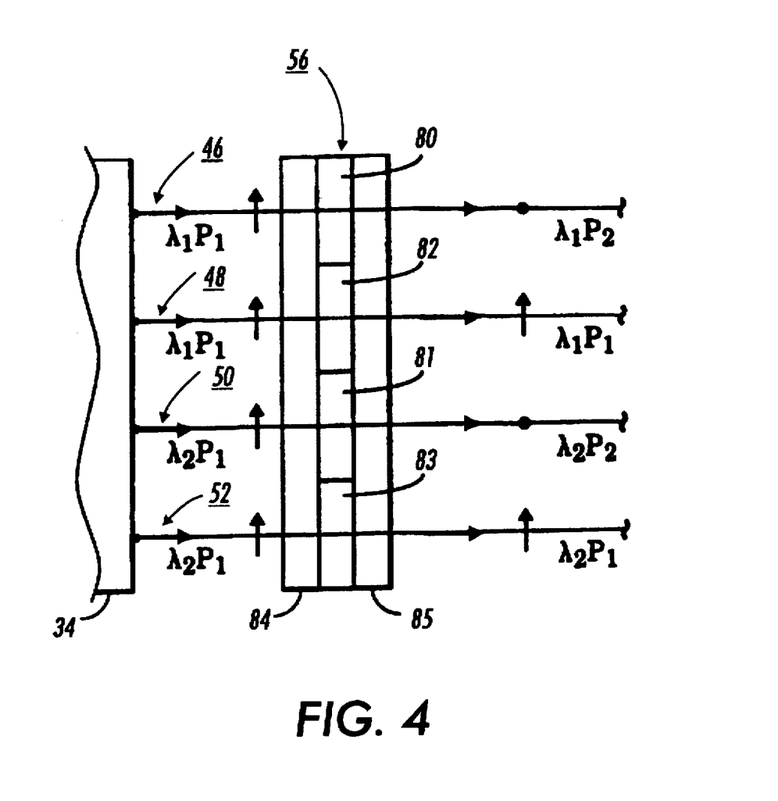
FIG. 4 is an elevational view similar to that of FIG. 3 in which the orthogonal polarization of two beams is shown as being rotated by 90°.

Referring to FIGS. 3 and 4, the operation of the segmented waveplate 56 is discussed in further detail. Referring specifically to FIG. 3, preferably, the segmented waveplate 56 is positioned in the paths of the beams 46, 48, 50 and 52 so that each wave passes through a respective one of sublayers 82, 83, 84, 85, and is inputted to a collimating lens 87 of optics system 16. Referring specifically to FIG. 4, the beams have been represented as rays for ease of discussion. As beams 46 and 50 pass through the respective polarization altering sublayers 82, 83, the respective polarizations of the beams are altered orthogonally. On the other hand, upon passing the beams 48 and 52 through the nonaltering sublayers 84, 85, the respective polarizations of beams 48 and 52 remain unchanged.

Figure 5:
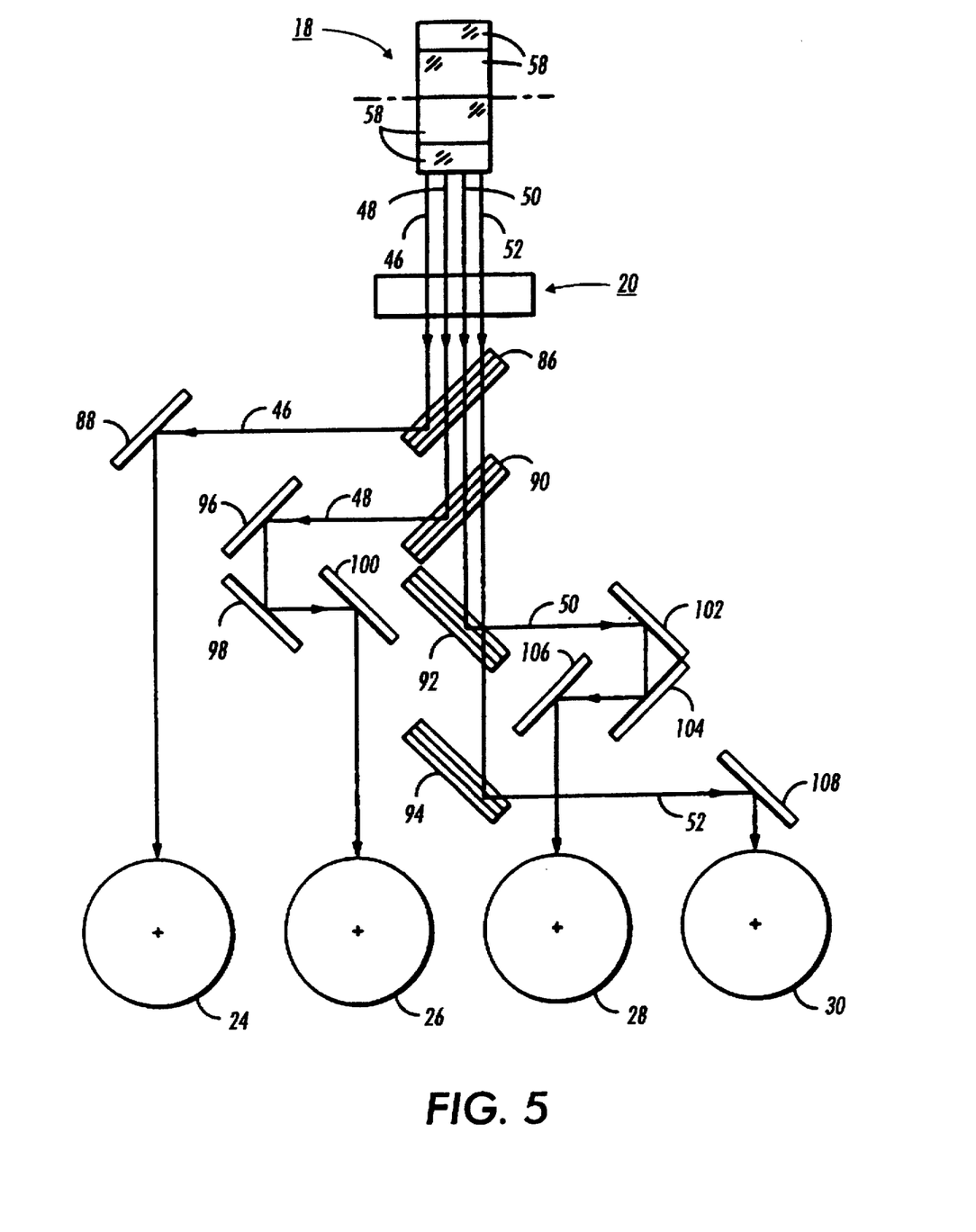
FIG. 5 is an elevational, simplified, schematic view of a separation arrangement in FIG. 1.
Figure 8:
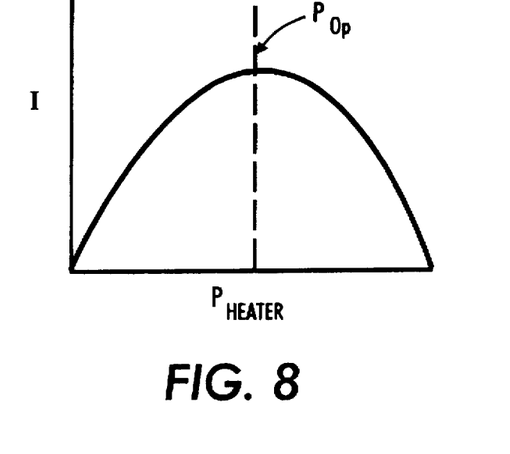
FIG. 8 is an elevational, schematic, perspective view of a circuit employed to heat a liquid crystal cholesteric reflector.

Referring to FIG. 5, the four laser beams from the image and correction optics 20 are input to a first optical filter 86. In one example of operation, the beams are circularly polarized as shown in FIG. 8. Preferably, the first optical filter 86 is a wavelength and polarization selective mirror comprising a cholesteric liquid crystal cell. The first optical filter 86 is characterized by a value of wavelength and polarization selective reflectivity, which value is chosen so that the beam 46 is reflected by the selective mirror of filter 86 and the beams 48, 50 and 52 are permitted to pass therethrough. Upon being reflected from the mirror of filter 86, the beam 46 is delivered to the photoreceptor 24 by use of a suitable reflective mirror 88.

A general discussion of liquid crystal technology can be found in Jacobs et al., "Liquid Crystal Laser Optics: Design, Fabrication, and Performance", J. Opt. Soc. Am., v. 5 at pp. 1962-1979 (1988), the pertinent portions of which are incorporated herein. More particularly, the liquid crystal cell of filter 86 can possess cholesteric pitch which is defined by reference to a spiral, such as a helix. Preferably, the helix is either right-handed for reflecting left-handed circularly polarized light or left-handed for reflecting right-handed polarized light. Additionally, the center wavelength of the reflectivity can be manipulated by adjusting the cholesteric pitch through choice of chiral dopant and its concentration, and the spectral bandwidth manipulated by choice of the refractive index difference between the long and short axes of the liquid crystal molecule.

Upon passing through the filter 86, each of the beams 48, 50 and 52 is successively reflected by one of optical filters 90, 92 and 94. Each of the filters 90, 92 and 94 are similar in construction to filter 86 except that each of the filters is characterized by a value of wavelength and polarization selective reflectivity, which value is chosen so as to reflect one of the beams 48, 50 and 52 and permit the other beams to pass therethrough. As illustrated in FIG. 5, the beam 48 is reflected by the filter 90 and delivered to the photoreceptor 26 by way of suitable mirrors 96, 98 and 100, the beam 50 is reflected by the filter 92 and delivered to the photoreceptor 28 by way of suitable mirrors 102, 104 and 106, and the beam 52 is reflected by the filter 94 and delivered to the photoreceptor 28 by way of a suitable mirror 108. It should be recognized that the number of optical filters used in the separation arrangement 22 can be varied in accordance with the desired level of beam contrast. For example, if high contrast for the beam 52 is not required, i.e., if the leakage from the filters 86, 90 and 92 can be communicated to the photoreceptor 30 without significantly degrading printing quality of the ROS arrangement 10, then the filter 94 can be deleted. On the other hand, contrast of the separation arrangement 22 can be maximized by operatively associating an auxiliary filter with each beam (an accordingly each filter) to minimize filter leakage.

As discussed in U.S. Pat. No. 5,371,526 to Appel et al., the problem of maintaining equal optical path lengths for each beam is reduced considerably by maintaining equal optical path lengths for the respective beams throughout a substantial portion of the separation arrangement. That is, referring to FIG. 5 of the present application, by properly adjusting the optical path lengths after the optical filter 86, the optical path lengths are set the same. This adjustment can be achieved by appropriate positioning of the mirrors 88, 96, 98, 100, 102, 104, 106 and 108. Proper adjustment of optical paths in the separation arrangement 22 results in similarly dimensioned spots at each of the photoreceptors 24, 26, 28 and 30, and reduces problems in registration.

Figure 6:
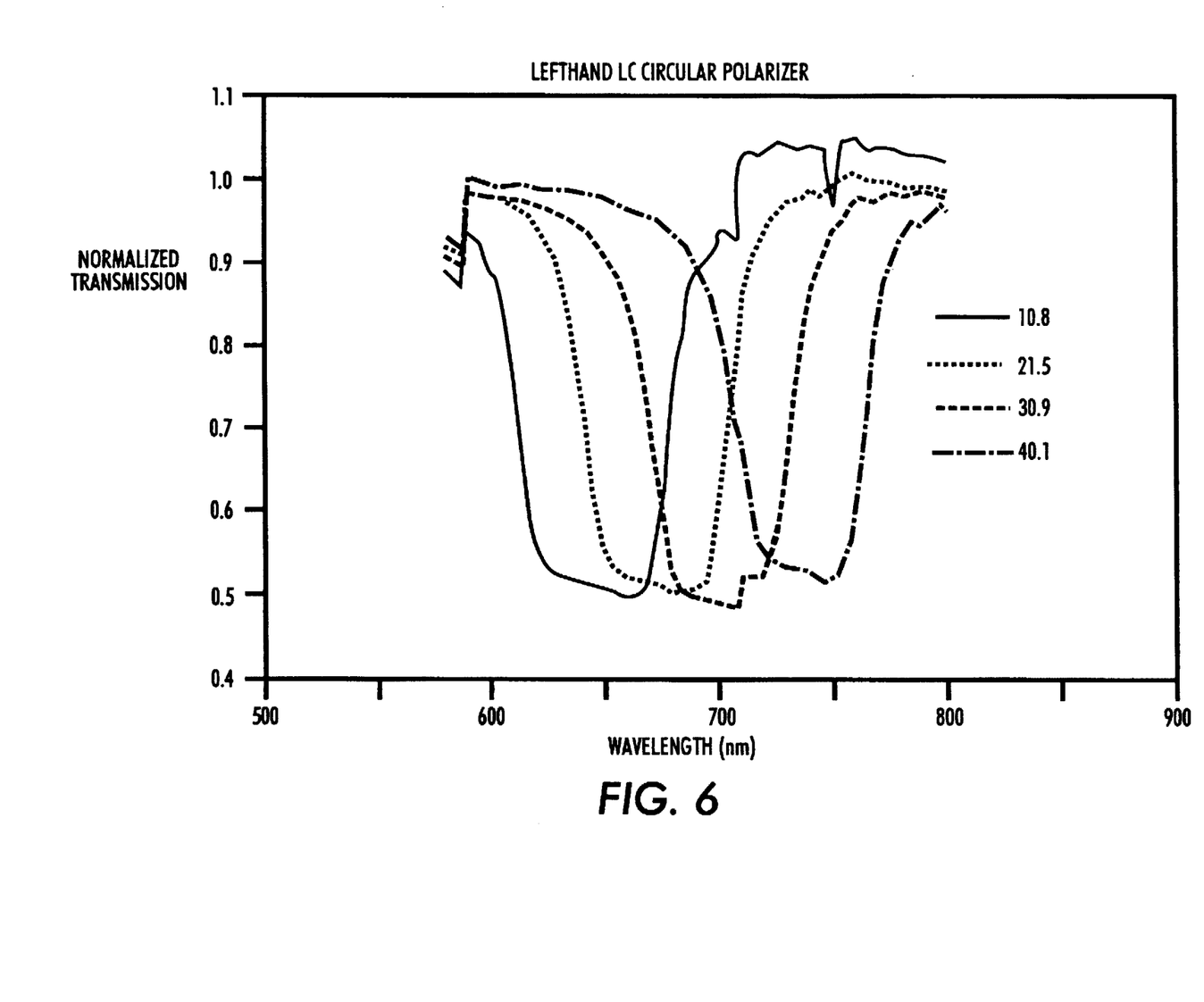
FIG. 6 is a set of curves demonstrating the temperature dependence of a given liquid crystal cholesteric reflector.

Referring still FIG. 5, it will be appreciated that the illustrated separation arrangement is commonly used in a document processing device (e.g. an input or output scanning device) whose temperature can vary significantly over time. Referring to FIG. 6, experimental data is provided, in graphic form, which demonstrates the temperature dependence of a wavelength of a selective reflection of a cholesteric liquid crystal designed for separation arrangements of the type shown in FIG. 5. In FIG. 6, the dip in cell transmission is due to reflection in that wavelength range. The minimum transmission is 0.5 because unpolarized light was used in generating the experimental data. From the experimental curves it may be observed that two beams at, for example, 640 nm and 685 nm can be separated with high contrast when a fixed temperature (10.8° C. in the illustrated graph of FIG. 6) is chosen. A different choice of cholesteric liquid crystal could narrow the reflection bandwidth allowing better contrast and even more closely spaced wavelengths. It should be understood, nevertheless, the same laser wavelengths may no longer be appropriate for high contrast separations when the ambient temperature of the system changes by even relatively small amounts. It should be further understood that such relatively small changes in temperature occur commonly in a document processing system which is subject to frequent usage. These changes in temperature can lead to problematic performance in document processing system operation.

It is believed that such problematic performance can be alleviated significantly by a solution in which a liquid crystal mixture that reduces the temperature dependence of the reflection peak wavelength is chosen. This solution, however, is believed to be less than optimal and a more generic solution, which applies to even preexisting separation arrangements with liquid crystal reflectors, is believed to be desirable.

Figure 7A:
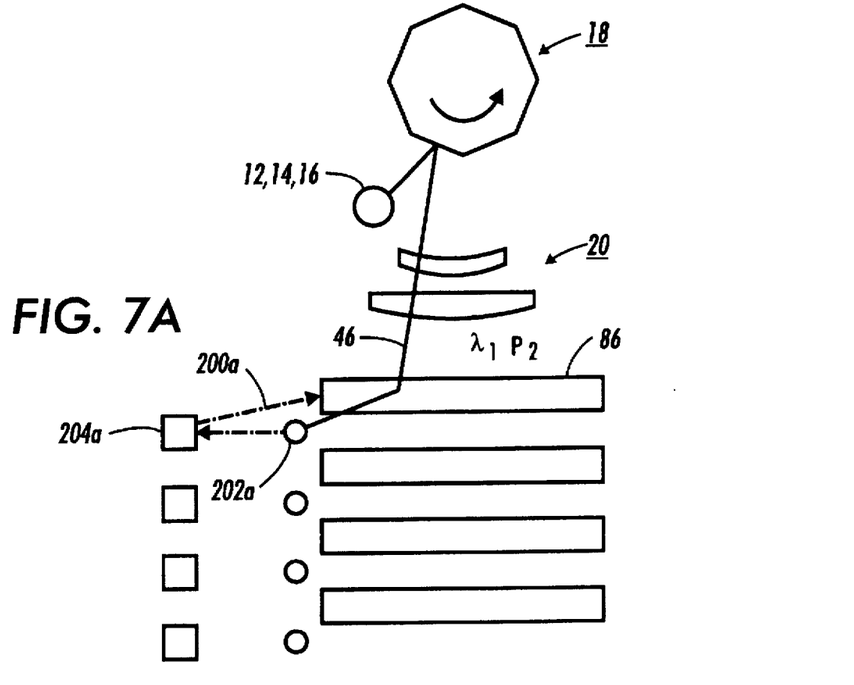
FIGS. 7(a)–7(d) represent four perspective views of a control system with each view demonstrating a similar approach for maximizing the reflectivity of a given beam.
Figure 7B:
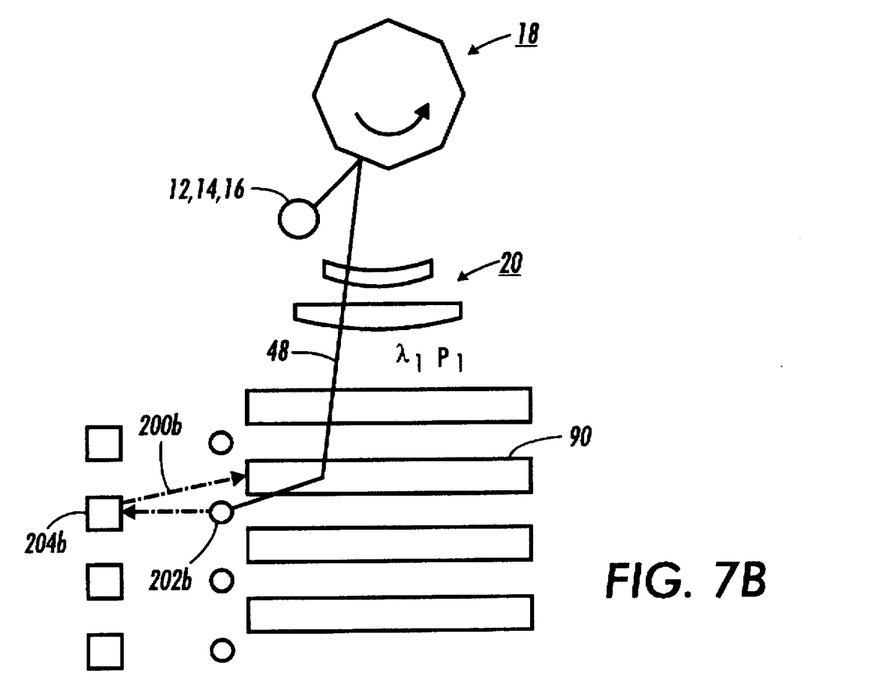
Figure 7C:
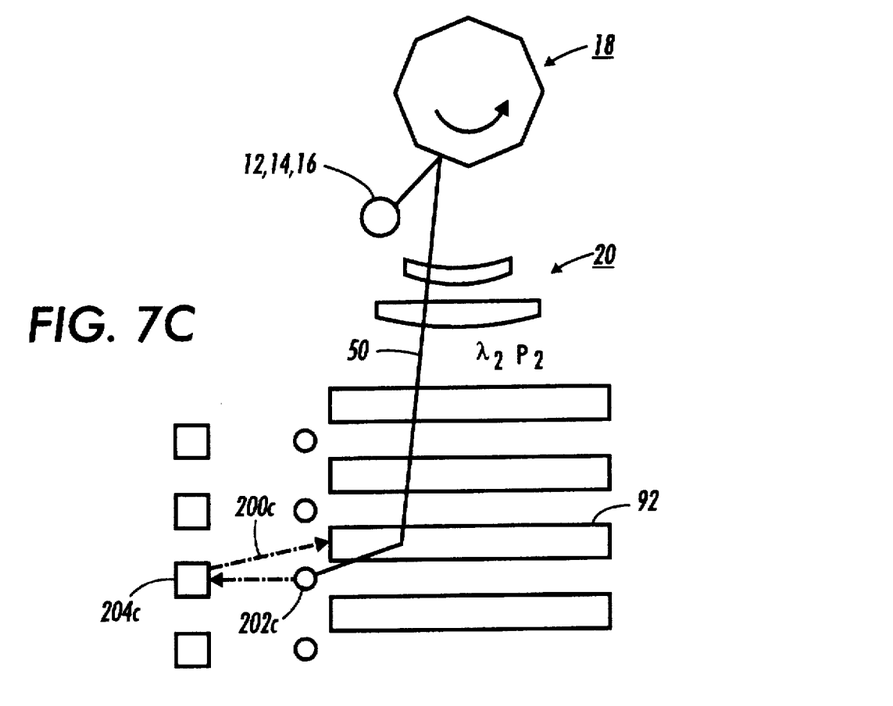
Figure 7D:
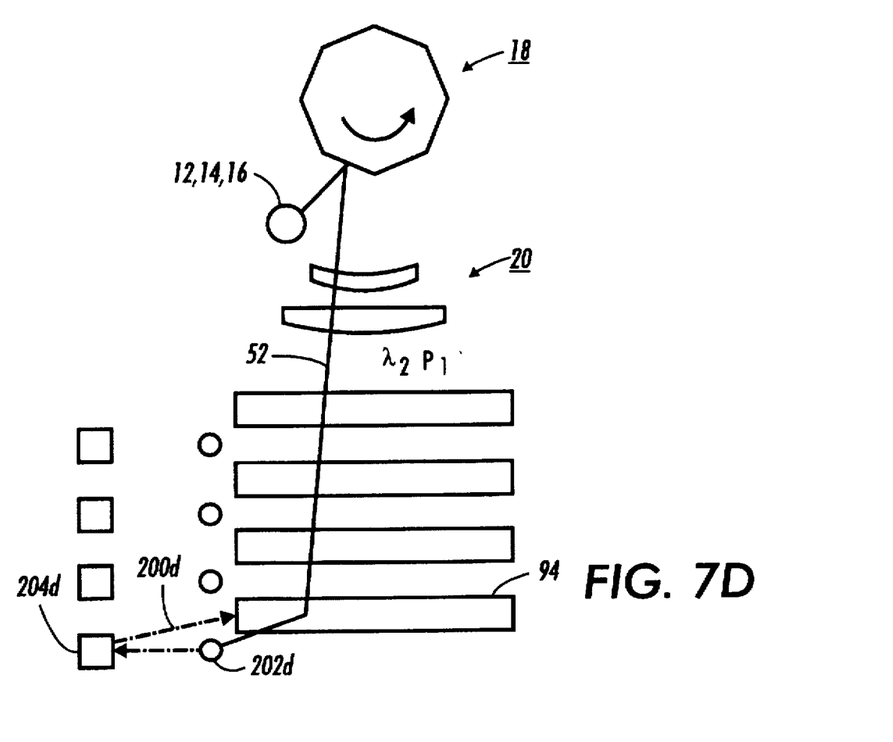

Referring to FIGS. 7(a)–7(d), control systems which optimize temperature levels and maximize beam reflectivity for the optical filters 86, 90, 92 and 94 (FIG. 5), are designated by the numerals 200(a)–200(d). In the preferred embodiment, each of the control systems of FIGS. 7(b)–7(c) is equivalent, in terms of structure and operability, to the control system 200a. Accordingly, a discussion of the structure and operability associated with each of control systems 200(b)–200(d) is not provided. Additionally, it will be recognized that for ease of demonstration, the optical filters are shown as being positioned differently than in FIG. 5. In a ROS environment with multiple photoreceptors, however, the optical filters of FIGS. 7(a)–7D) would probably be arranged as shown in FIG. 5.

Referring specifically to FIG. 7(a), control system 200a includes a sensor 202a, preferably disposed adjacent optical filter 86 and a control subsystem 204a communicating with both the sensor and the optical filter. In one example, the sensor 202a is a photodiode type sensor and is associated with a start-of-scan for the photoreceptor 24. In another example, the sensor 202a could assume the form of a temperature sensor or thermocouple.

Referring to FIG. 8, optical filter 86 is shown with a heating subsystem, the heating subsystem, in one embodiment, including a heating element 206 communicating with an amplifier 208. The heating subsystem is further shown as including a photodiode 210 for measuring the intensity of the beam 46. Preferably the photodiode is associated with the sensor 202a and the amplifier 208 is associated with the control subsystem 204a.

In an alternative embodiment, the heating subsystem of FIG. 8 could be altered slightly to provide an electrostrictive subsystem in which an applied electric field, rather than heat, is applied to the optical filter 86. In this way the wavelength of the reflection maximum is dependent on the magnitude of the applied electric field rather than the heat generated by the heating subsystem.

In the preferred embodiment the heating element is a resistive strip and liquid crystal technology is employed to provide the internal resistive strip heater. The resistive strip could be indium tin oxide (ITO) that is deposited on an inner surface of the optical filter 86. ITO is a transparent electrode material routinely used in the liquid crystal display industry. ITO has a resistivity that is dependent upon how it is coated and the resistivity can be specified over a wide range. By passing a current through the ITO resistive heater, the temperature of the cell can be increased. As will appear, proper choice of the ITO resistivity and the current flow allow the temperature of the cell 86 to be set appropriately. As will be appreciated, other materials, such as nicrome, could be employed to implement the heater 206 without altering the concept upon which the heating subsystem of FIG. 8 is based.

Figure 9:
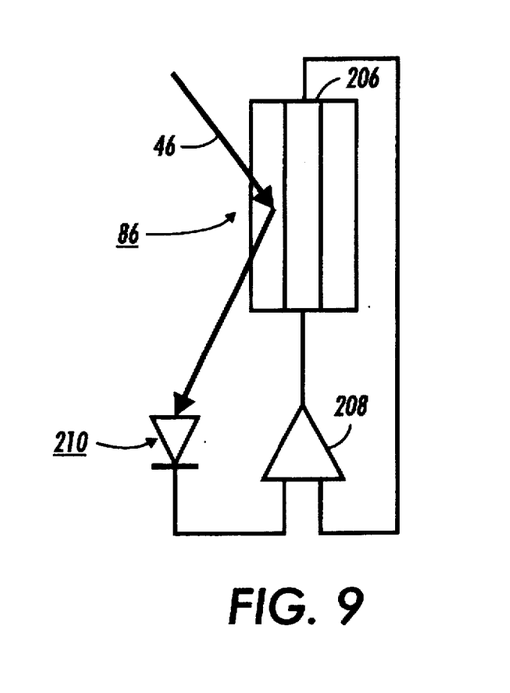
FIG. 9 is a companion graph for FIGS. 7(a)-7(d) demonstrating an approach for maximizing reflectivity.

Referring conjunctively to FIGS. 7(a), 8 and 9, the power of the heater 206 ($P_{Heater}$) can be increased or decreased to maximize beam reflectivity. In practice, the feedback loop of control system 200a is used to determine when maximum light intensity (I) is achieved at the sensor 202a for setting $P_{Heater}$ at an optimum setting, namely $P_{op}$. In one example of operation the respective optimum temperatures for the optical filters 86, 90, 92 and 94 are initially set by first transmitting the beam 46 to the optical filter 86, measuring I and increasing or decreasing $P_{Heater}$ until both a maximum value for I and a value for $P_{op}$ are obtained. This procedure is repeated for beam 48, with respect to optical filter 90 (FIG. 7(b)), beam 50, with respect to optical filter 92 (FIG. 7(c)), and beam 52, with respect to optical filter 94 (FIG. 7(d)). Subsequent to initialization of $P_{Op}$, the control systems 200a–200d operate dynamically to accommodate for temperature dependence of the wavelength of the reflection maximum among the optical filters 86, 90, 92 and 94.

Preferably, the respective temperatures of the optical filters are operated at a level corresponding to about or above a maximum temperature for the document processing system in which the optical filters reside. In this way, cooling of the optical filters, during operation, is unnecessary.

Numerous features of the above-disclosed embodiment will be appreciated by those skilled in the art. First, a beam separating system is provided in which optical filters are heated, or subjected to an electric field, for optimizing system performance of a document processing related subsystem, such as an input or output scanning device. Maximizing reflected intensity (I) by adjusting the current in each heater, or an electric field across each optical filter, ensures that the beam separator is always operating at the peak of its performance.

Second, the above-disclosed embodiment optimizes the overall system performance of a multistation ROS, as measured by maximizing the reflectivity for each beam, thus minimizing the crosstalk amongst all of the beams. Each laser of the laser array can be operated on separate scans for the closed loop control thereby making it possible to confirm that the actual contrast for each beam is within acceptable limits.

Third, application of current or potential to each optical filter is controlled tightly with a closed loop feedback system. Use of such closed loop feedback systems afford dynamic and automatic adjustment for changes in the laser wavelength.

Finally, each of the control systems of the above-described embodiment is simple to implement. In one example, heaters are obtained by providing each optical crystal with an effective resistive strip constructed from indium tin oxide. In another example, each control system can exploit preexisting hardware, such as the start-of-scan detector associated with a corresponding photoreceptive member.

What is claimed is:

1. In a laser system with a laser beam generating device providing a laser beam, the laser beam being transmitted along a path, an optical filtering system, comprising:
   an optical filter, disposed in the path, for reflecting a portion of the laser beam; and
   a heating subsystem thermally communicating with said optical filter, said heating subsystem including an adjustable power level and the adjustable power level of said heating subsystem being adjusted so as to optimize a degree to which the portion of the laser beam is reflected by said optical filter.

2. The optical filtering system of claim 1, in which the laser beam includes an intensity and said heating subsystem includes a heater with the adjustable power level, wherein said heating subsystem includes a control circuit for adjusting the adjustable power level of the heater when the laser beam intensity varies from a preset reference by a selected amount.

3. The optical filtering system of claim 2, wherein said control circuit includes:
   a sensor, disposed adjacent said optical filter, for sensing the laser beam intensity; and
   a controller, communicating with said sensor and the heater, for varying the adjustable power level of said heating subsystem so that the laser beam intensity is within the preset reference by the selected amount.

4. The optical filtering system of claim 3, in which the laser beam is characterized by a wavelength and a polarization, and the wavelength or polarization is chosen so that a substantial portion of the laser beam is reflected by said optical filter, wherein:
   said sensor determines if the laser beam intensity is at a relative maximum value; and
   when the laser beam intensity varies from the relative maximum value by the selected amount, the adjustable power level of the heater is varied until the laser beam intensity is within the relative maximum value by the selected amount.

5. The optical filtering system of claim 1, wherein said optical filter comprises a liquid crystal cell.

6. The optical filtering system of claim 5, in which said heating subsystem includes a heater, wherein the heater comprises an indium tin oxide element with said indium tin oxide element being formed integrally with said liquid crystal cell.

7. The optical filtering system of claim 1, in which the laser beam comprises a first laser beam including both a first wavelength and a first polarization and the laser beam generating device provides a second laser beam including both a second wavelength and a second polarization, wherein a preset reference is chosen so that substantially all of the first laser beam is reflected by said optical filter and substantially all of the second beam is transmitted through said optical filter.

8. The optical filtering system of claim 1, in which the laser processing system is characterized by a variable temperature level including a maximum temperature level, wherein while the optical filtering system is in a steady state condition the temperature level of the laser system is maintained at about the maximum temperature level.

9. In a laser system with a laser beam generating device providing a laser beam with an intensity, the laser beam being directed along a path, an optical filtering system, comprising:
   an optical filter, disposed in the path, for reflecting a portion of the laser beam;
   an adjustable electric field generator, communicating with said optical filter, for applying an adjustable electric field to said optical filter; and
   a control circuit, communicating with said adjustable electric field generator, for varying the adjustable electric field, the adjustable electric field being set at a level so as to optimize a degree to which the portion of the laser beam is reflected by said optical filter.

10. The optical filtering system of claim 9, wherein said control circuit includes:
   a sensor, disposed adjacent said optical filter, for sensing the laser beam intensity; and
   a controller, communicating with said sensor and said adjustable electric field generator, for varying the adjustable electric field so that the laser beam intensity is within a preset reference by a selected amount.

11. The optical filtering system of claim 10, in which the laser beam is characterized by a wavelength and a polarization, and the wavelength or polarization of the laser beam is chosen so that a substantial portion thereof is reflected by said optical filter, wherein:
   said sensor determines if the laser beam intensity is at a relative maximum value; and
   when the laser beam intensity varies from the relative maximum value by the selected amount, the adjustable electric field is varied until the laser beam intensity is within the relative maximum value by the selected amount.

12. The optical filtering system of claim 9, wherein said optical filter comprises a liquid crystal cell.

13. The optical filtering system of claim 9, in which the laser beam comprises a first laser beam including both a first wavelength and a first polarization and the laser beam generating device provides a second laser beam including both a second wavelength and a second polarization, wherein a preset reference is chosen so that substantially all of the first laser beam is reflected by said optical filter and substantially all of the second beam is transmitted through said optical filter.

* * * * *